(12) United States Patent
Okamoto et al.

(10) Patent No.: US 10,643,670 B2
(45) Date of Patent: May 5, 2020

(54) DISK DEVICE AND METHOD OF MANUFACTURING DISK DEVICE

(71) Applicant: Kabushiki Kaisha Toshiba, Minato-ku, Tokyo (JP)

(72) Inventors: Makoto Okamoto, Kodaira Tokyo (JP); Yasutaka Sasaki, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 16/264,889

(22) Filed: Feb. 1, 2019

(65) Prior Publication Data

US 2019/0164577 A1    May 30, 2019

Related U.S. Application Data

(63) Continuation of application No. 15/995,834, filed on Jun. 1, 2018, now Pat. No. 10,242,715, which is a (Continued)

(51) Int. Cl.

| | |
|---|---|
| *G11B 33/14* | (2006.01) |
| *G11B 33/02* | (2006.01) |
| *B23K 26/0622* | (2014.01) |
| *B23K 26/244* | (2014.01) |
| *G11B 25/04* | (2006.01) |
| *B23K 26/082* | (2014.01) |
| *B23K 26/073* | (2006.01) |
| *B23K 26/26* | (2014.01) |
| *B23K 101/36* | (2006.01) |

(52) U.S. Cl.
CPC ........ *G11B 33/027* (2013.01); *B23K 26/0622* (2015.10); *B23K 26/073* (2013.01); *B23K 26/082* (2015.10); *B23K 26/244* (2015.10); *B23K 26/26* (2013.01); *G11B 25/043* (2013.01); *G11B 33/148* (2013.01); *G11B 33/1446* (2013.01); *B23K 2101/36* (2018.08)

(58) Field of Classification Search
CPC .......................... G11B 33/1446; G11B 33/027
USPC ..................................................... 360/97.22
See application file for complete search history.

(56) References Cited

U.S. PATENT DOCUMENTS 6,296,691 B1 * 10/2001 Gidumal ............ B01D 46/0032
                                                    360/99.16
7,092,203 B2    8/2006 Inoue et al.
(Continued)

FOREIGN PATENT DOCUMENTS

| JP | 2002-316265 A | 10/2002 |
|---|---|---|
| JP | 5049017 B2 | 10/2012 |
| JP | 2014-004603 A | 1/2014 |

*Primary Examiner* — Allen T Cao
(74) *Attorney, Agent, or Firm* — White & Case LLP (57) ABSTRACT

According to one embodiment, a disk device includes a disk-shaped recording medium, a head which processes data on the recording medium, and a housing accommodating the recording medium and the head. The housing includes a base with a side wall, and a cover having a welded portion welded to the side wall by laser welding. The welded portion includes a first welded portion welded to a first region of the side wall and having weld beads with a first shape, and a second welded portion welded to a second region of the side wall and having welded beads with a second shape different from the first shape.

13 Claims, 8 Drawing Sheets

Related U.S. Application Data continuation of application No. 15/683,974, filed on Aug. 23, 2017, now Pat. No. 10,020,027, which is a continuation of application No. 15/459,697, filed on Mar. 15, 2017, now Pat. No. 9,779,779.

(60) Provisional application No. 62/382,897, filed on Sep. 2, 2016.

(56) References Cited

U.S. PATENT DOCUMENTS

| | | | |
|---|---|---|---|
| 7,508,682 B2 * | 3/2009 | Badarinarayan ... | B23K 20/1265 361/752 |
| 7,957,092 B2 * | 6/2011 | Ichikawa ............. | G11B 25/043 360/99.2 |
| 8,014,167 B2 | 9/2011 | Gunderson et al. | |
| 8,451,559 B1 | 5/2013 | Berding et al. | |
| 8,917,477 B1 * | 12/2014 | Miyake ................ | G11B 33/146 360/97.18 |
| 9,183,889 B1 * | 11/2015 | Smyth .................. | G11B 25/043 |
| 9,460,756 B1 | 10/2016 | Forbord et al. | |
| 2002/0034040 A1 * | 3/2002 | Tomioka ............ | G11B 33/1453 360/97.12 |
| 2002/0063990 A1 * | 5/2002 | Hirasaka ............ | G11B 33/1486 360/97.18 |
| 2005/0036232 A1 * | 2/2005 | Macpherson ........ | G11B 25/043 360/97.18 |
| 2005/0068666 A1 | 3/2005 | Albrecht et al. | |
| 2006/0066974 A1 | 3/2006 | Akamatsu et al. | |
| 2006/0291095 A1 | 12/2006 | Inoue et al. | |
| 2008/0088969 A1 | 4/2008 | Uefune et al. | |
| 2008/0165448 A1 | 7/2008 | Ichikawa et al. | |
| 2008/0212237 A1 | 9/2008 | Uefune et al. | |
| 2008/0310048 A1 | 12/2008 | Hirono et al. | |
| 2010/0214732 A1 | 8/2010 | Charles et al. | |
| 2014/0368948 A1 | 12/2014 | Okutani | |
| 2015/0332733 A1 | 11/2015 | Lapp et al. | |
| 2019/0074615 A1 * | 3/2019 | Okamoto ............... | G11B 23/00 |

* cited by examiner

DISK DEVICE AND METHOD OF MANUFACTURING DISK DEVICE

CROSS-REFERENCE TO RELATED APPLICATIONS

This application is a continuation of U.S. application Ser. No. 15/995,834, filed Jun. 1, 2018, which is a continuation of U.S. application Ser. No. 15/683,974, filed Aug. 23, 2017, which is a continuation of Ser. No. 15/459,697, filed Mar. 15, 2017 which claims the benefit of Provisional Application No. 62/382,897, filed Sep. 2, 2016, the entire contents of each are incorporated herein by reference.

FIELD

Embodiments described herein relate generally to a disk device and a method of manufacturing the disk device.

BACKGROUND

As a disk device, a magnetic disk drive is known, which comprises a housing including a base and a top cover and accommodating therein a rotatable magnetic disk and an actuator which supports a magnetic head. Further, such a method of improving the performance of a disk drive has been proposed, that the housing is sealed with a low-density gas such as helium so as to reduce the rotation resistance of the magnetic disk and the magnetic head.

In such a magnetic disk drive, the top cover is jointed to the base of the housing by laser welding to form an enclosed housing and increase the airtightness of the housing. The laser welding is carried out on along an entire outer circumference of the top cover. Here, in order to obtain high airtightness, it is necessary to maintain a stable welding quality all around the circumference.

DETAILED DESCRIPTION

Various embodiments will be described hereinafter with reference to the accompanying drawings. In general, according to one embodiment, a disk device includes a rotatable discoidal recording medium, a head which processes data on the recording medium and a housing accommodating the recording medium and the head and a cover including a welded portion joined to the base by laser welding. The welded portion includes a first welded portion formed under a first laser irradiation condition and a second welded portion formed under a second laser irradiation condition different from the first laser irradiation condition.

As examples of a magnetic disk device, hard disk drives (HDD) according to embodiments will now be described in detail.

First Embodiment

Figure 1:
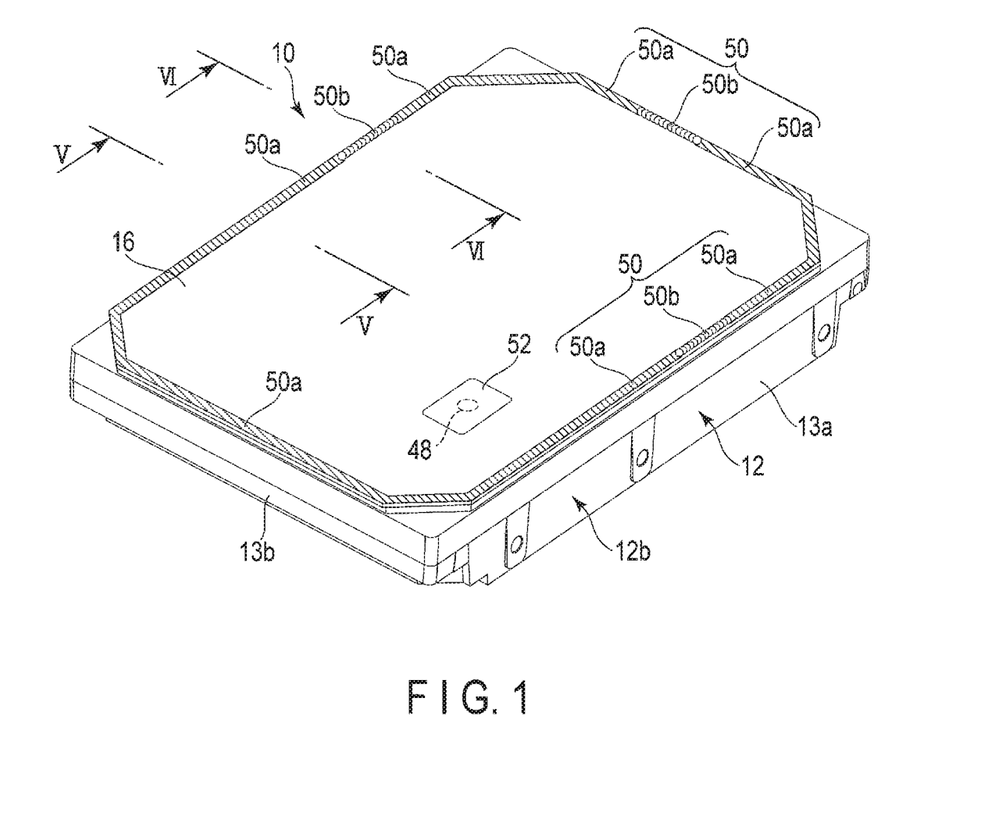
FIG. 1 is a perspective view showing an appearance of a hard disk drive (HDD) according to the first embodiment.
Figure 2:
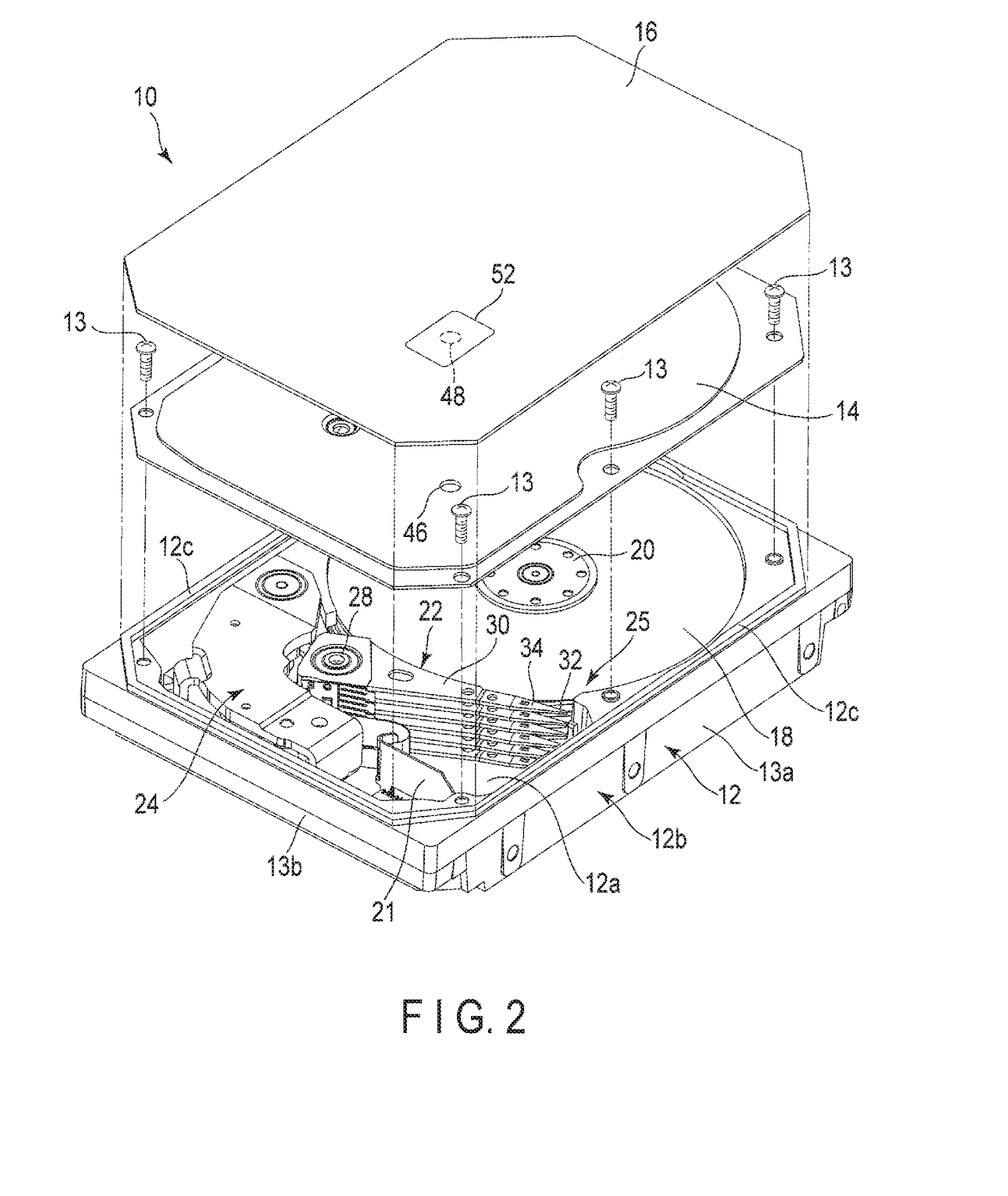
FIG. 2 is an exploded perspective view of the HDD according to the first embodiment.

FIG. 1 is a perspective view showing the appearance of an HDD according to a first embodiment, and FIG. 2 is an exploded perspective view showing an internal structure of the HDD.

As shown in FIGS. 1 and 2, the HDD comprises a flat and substantially rectangular housing 10. The housing 10 comprises a rectangular box-shaped base 12 an upper surface of which is opened, an inner cover 14 screwed to the base 12 with a plurality of screws 13 to close the opening of the upper end of the base 12, an outer cover (top cover) 16 overlaid on the inner cover 14 and including a circumferential portion welded to the base 12. The base 12 includes a rectangular bottom wall 12a opposes the inner cover 14 with a gap therebetween and side walls 12b provided to stand along with the periphery of the bottom wall, which are molded into one body with, for example, aluminum. The side wall 12b includes a pair of long side walls 13a opposing each other and a pair of short side walls 13b opposing each other. On upper end surfaces of the side walls 12b, a substantially rectangular frame-shaped fixing rib 12c is provided to project therefrom. The inner cover 14 is formed from, for example, stainless steel into a rectangular plate. The circumferential portion of the inner cover 14 is screwed to the upper surfaces of the side walls 12b of the base 12 with the screws 13, and thus fixed to an inner side of the fixing rib 12c. The outer cover 16 is formed from, for example, aluminum into a rectangular plate. The outer cover 16 has dimensions slightly larger than those of the inner cover 14. The circumferential portion of the outer cover 16 is welded to the fixing rib 12c of the base 12 over its entire circumference, to be airtightly fixed. The welded structure will be described in detail later.

Vents 46 and 48 to communicate the outside and inside of the housing 10 with each other are formed in the inner cover 14 and the outer cover 16, respectively. The air in the housing 10 is discharged through the vents 46 and 48 and then a low-density gas (inert gas) having a density lower than that of air, for example, helium is introduced through the vents 46 and 48 and enclosed or sealed in the housing 10. For example, a seal (sealing member) 52 is stuck on the outer surface of the outer cover 16 so as to close the vent 48.

As shown in FIG. 2, the housing 10 accommodates therein a plurality of magnetic disks 18 as recording media and a spindle motor 20 as a drive section, which supports and rotates the magnetic disks 18. The spindle motor 20 is placed on the bottom wall 12a.

Each of the magnetic disks 18 is formed to have a diameter of, for example, 88.9 mm (3.5 inches) and include a magnetic recording layer on the upper and/or lower surface thereof. The magnetic disks 18 are engaged coaxially with a hub (not illustrated) of the spindle motor 20, and are clamped with a clamp spring to be fixed to the hub. Thus, each magnetic disk 18 is supported and situated to be parallel to the bottom wall 12a of the base 12. Each magnetic disk 18 is rotated at a predetermined number of revolutions with the spindle motor 20.

Note that five magnetic disks 18 are accommodated in the housing 10 in this embodiment as shown in FIG. 2, but the number of magnetic disks 18 is not limited to this. Or a single magnetic disk 18 may be accommodated in the housing 10.

The housing 10 accommodates therein a plurality of magnetic heads 32 which write/read data on/from the magnetic disks 18, a head stack assembly (actuator) 22 which supports the magnetic heads 32 movably with respect to the magnetic disks 18. The housing 10 further accommodates therein a voice coil motor (to be referred to as VCM) 24 which rotates and aligns the head stack assembly 22, a ramp load mechanism 25 which retains the magnetic heads 32 in an unload position away from the magnetic disks 18 when the magnetic heads 32 moved to the outermost circumference of the magnetic disks 18, and a board unit 21 on which electronic components including a conversion connector and the like are mounted.

The head stack assembly 22 comprises a rotatable bearing unit 28, a plurality of arms 30 extending from the bearing unit 28, and a plurality of suspensions 34 extending from the respective arms 30, and a magnetic head 32 is supported on a distal end of each suspension 34.

A printed circuit board (not shown) is attached to an outer surface of the bottom wall 12a of the base 12. The printed circuit board 25 controls operations of the spindle motor 20, and also the VCM 24 and the magnetic heads 32 via the substrate unit 21.

Figure 3:
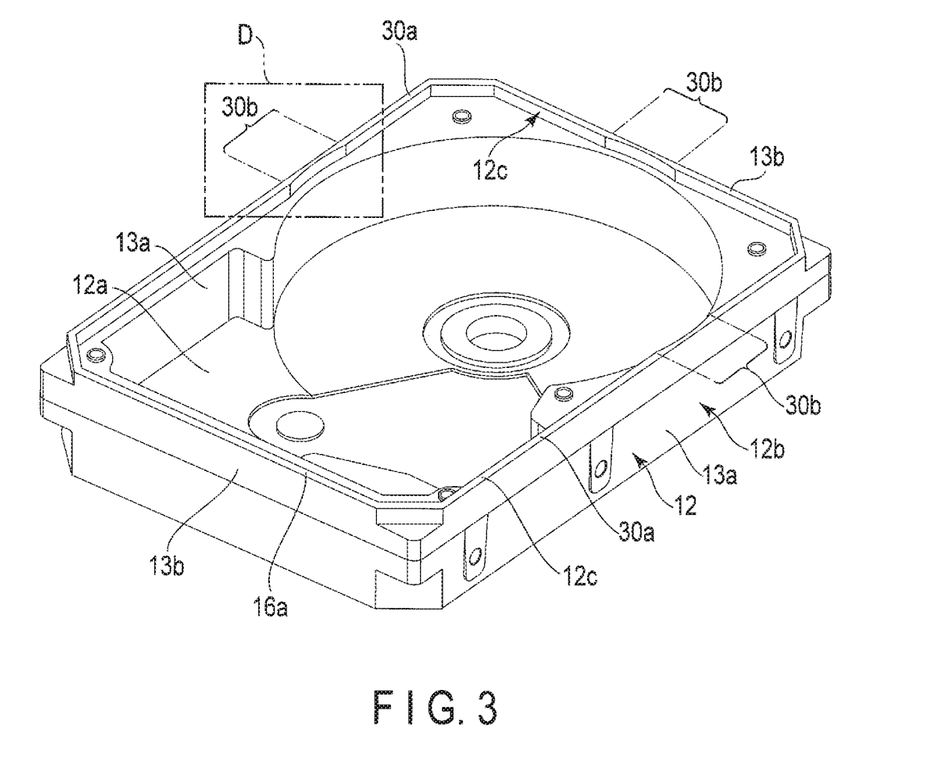
FIG. 3 is a perspective view showing a base of a housing of the HDD.
Figure 4:
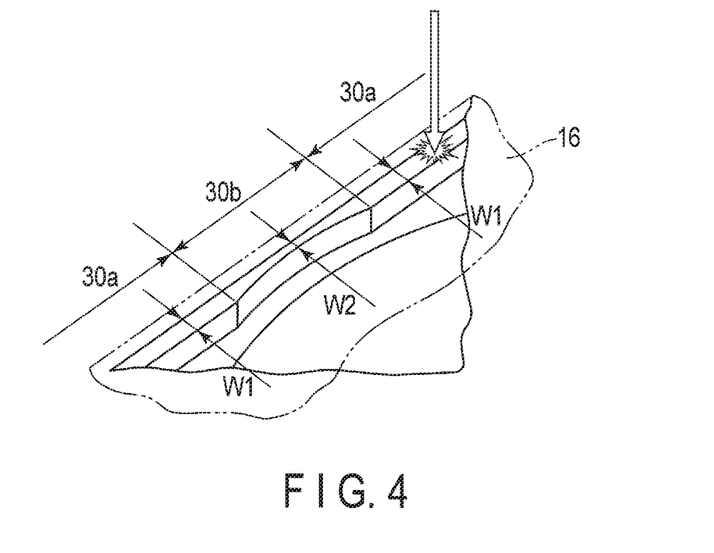
FIG. 4 is an expanded perspective view of a region D in FIG. 3.
Figure 5:
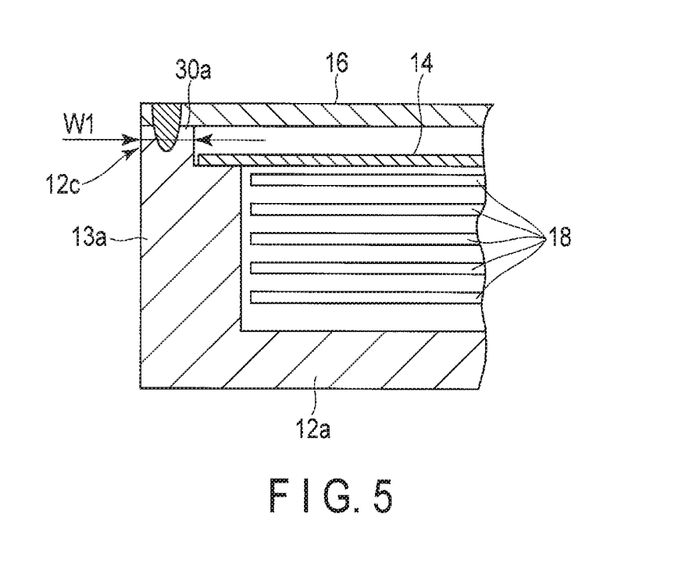
FIG. 5 is a cross section of the HDD taken along line V-V in FIG. 1.
Figure 6:
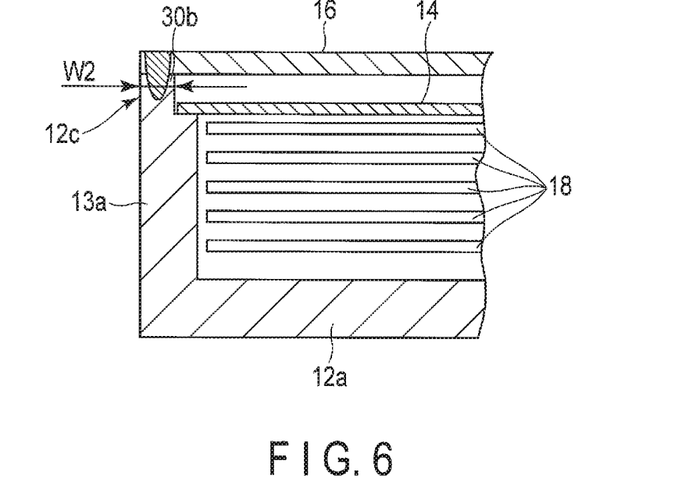
FIG. 6 is a cross section of the HDD taken along line VI-VI in FIG. 1.

FIG. 3 is a perspective view showing the base 12 of the housing 10 when the structural elements are removed. FIG. 4 is a perspective view of a narrow portion of the base. FIG. 5 is a cross section of the housing taken along line V-V in FIG. 1. FIG. 6 is a cross section of the housing taken along line VI-VI in FIG. 1. As shown in FIGS. 3 and 4, the rectangular frame-shaped fixing rib 12c is integrally provided on the upper end surfaces of the side walls 12b of the base 12. The rib 12c is formed in its most part as a first region (broad portion) 30a having a first width W1. At least a part of the rib 12c, in this embodiment, there are three second regions (narrow portion) 30b having a second width W2 less than the first width W1. Of the three second regions 30b of the rib 12c, two are located on the right and left long side walls 13a located adjacent to the outer circumference edge of the respective magnetic disk 18, and one is located at the central portion of one short side wall 13b. The side surface of each second region 16b on a magnetic disk 18 side is concaved into a shape of an arc along the outer circumference edge of the magnetic disk 18.

As shown in FIGS. 1, 5 and 6, the circumferential portion of the outer cover 16 is welded to the rib 12c of the base 12, thus forming a rectangular frame-shaped welded portion 50 formed along its entire circumference. The welded portion 50 includes a first welded portion 50a laser-welded to the first region 30a of the rib 12c under a first laser irradiation condition, which will be described later, and three second welded portions 50b welded to the second regions 30b of the rib 12c, respectively, under a second laser irradiation condition different from the first laser irradiation condition.

Figure 7:
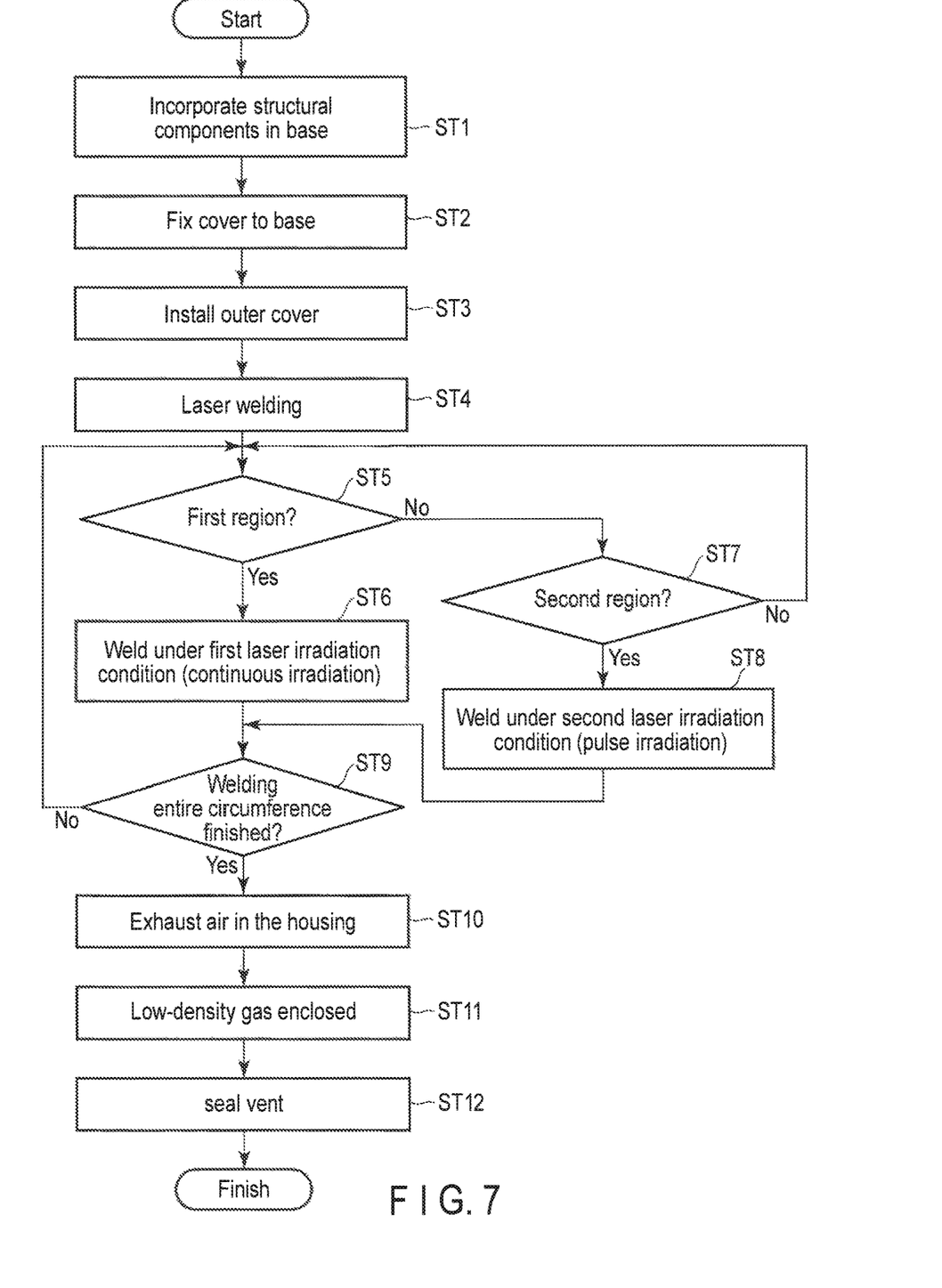
FIG. 7 is a flowchart illustrating a manufacturing process for the HDD.

Next, a method of manufacturing the HDD configured as above, a welding method and a welded structure will be described. FIG. 7 is a flowchart schematically illustrating an example of the manufacturing process, and FIG. 8 is a plan view schematically showing an example of the welding process for the HDD.

As shown in FIG. 7, first, the spindle motor 20, the magnetic disk 18, the head stack assembly 22 and other structural components are incorporated and installed on the base 12 of the housing 10 in, for example, a clean room (ST1). Then, the inner cover 14 is put on the base 12 and fixed to the base 12 with the screws 13 to close the opening of the base 12 (ST2).

Figure 8:
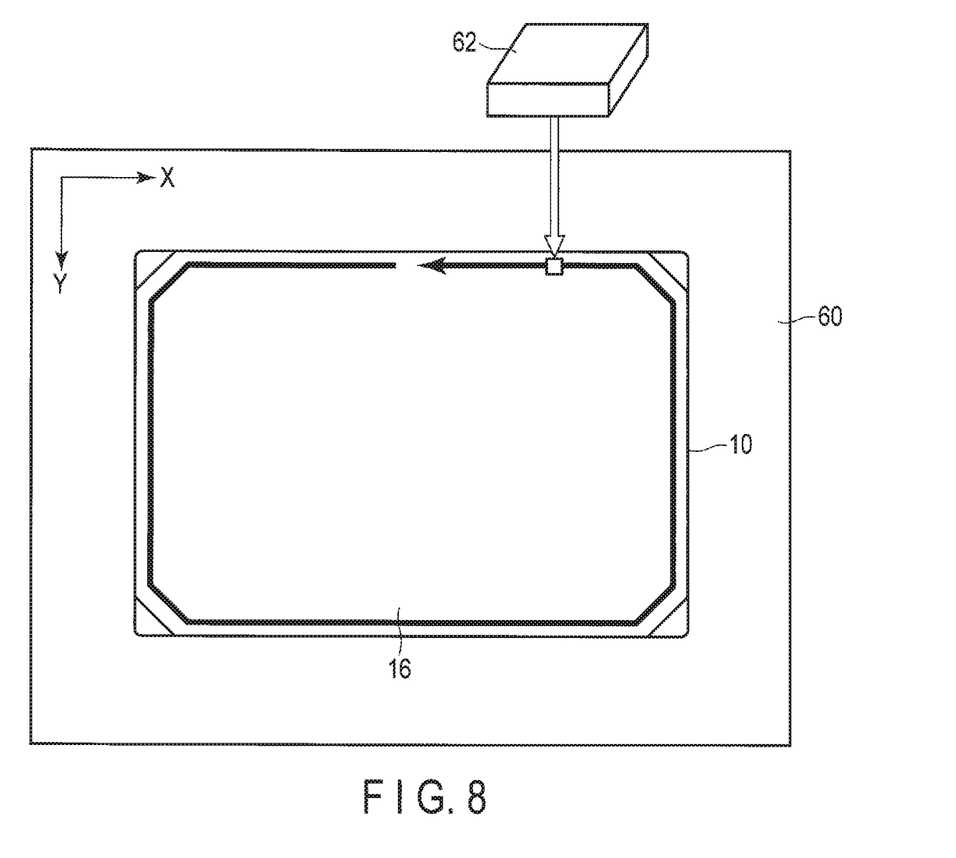
FIG. 8 is a plan view schematically showing an example of a processing step in the manufacturing process.

Further, after installing the outer cover 16 to be overlaid on the inner cover 14 (ST3), the housing 10 is set on an XY table 60 as shown in FIG. 8. The XY table 60 is movable in the X direction and the Y direction perpendicularly intersecting therewith by a driver source (not shown). A laser beam irradiation device (light-emitting optical head) 62 is provided above the XY table 60. The laser beam irradiation device 62 irradiates a laser beam onto a predetermined position of the outer cover 16 of the HDD to regionally fuse the rib 12c of the base 12 and the outer cover 16 and weld the outer cover 16 to the rib 12c (ST4). By the welding, the outer cover 16 is regionally fused and solidified to form weld beads (welded portion 50) on an outer circumferential portion of the outer cover 16.

In the welding process, a laser beam is irradiated to the circumferential portion of the outer cover 16 by the laser beam irradiation device 62 while moving the housing 10 in the direction of X and the Y direction as required with the XY table 60, and thus the circumferential portion of the outer cover 16 is subjected to laser welding continuously all around its circumference.

As shown in FIG. 7, it is judged in the welding process whether or not the region to which the outer cover 16 is to be welded is the first region 30a of the rib 12c of the base 12 (ST5), and if it is the first region 30a, the laser beam is irradiated onto the outer cover 16 under the first laser irradiation condition (ST6) to be welded. Under first laser irradiation condition, the irradiation position is set for welding the outer cover 16 to the first region 30a of the rib 12c so that the laser beam is irradiated to the central portion of the rib 12c in the width W1 direction as shown in FIG. 5.

As shown in FIG. 7, it judged as not the first region 30a to weld in ST5, then is further judged whether or not the region to weld is the second region 30b of the rib 12c (ST7). If judged that it is the second region 30b, the laser beam is irradiated onto the outer cover 16 under the second laser irradiation condition different from the first laser irradiation condition to weld the outer cover 16 to the second region 30b of the rib 12c (ST8). Under the second laser irradiation condition, the irradiation position is set for welding the outer cover 16 to the second region 30b of the rib 12c so that the laser beam is irradiated onto the central portion of the rib 12c in the width W2 direction as shown in FIG. 6. In other words, in the second laser irradiation condition, the distance from an outer edge of the rib 12c to the laser irradiation position is set shorter than the distance from the outer edge of the rib 12c to the laser irradiation position in the first laser irradiation condition. In the second laser irradiation condition, the laser irradiation position is shifted towards the outer edge side of the rib 12c as compared to the laser irradiation position in the first laser irradiation condition.

Figure 9:
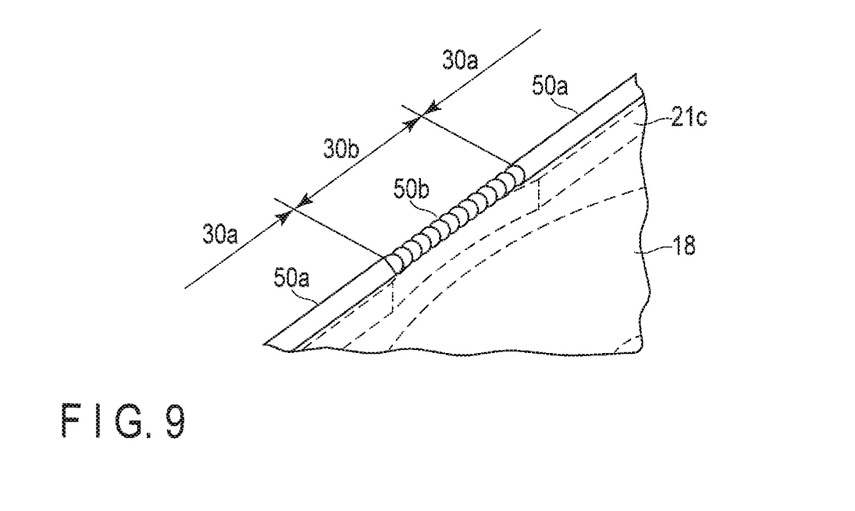
FIG. 9 is a perspective view schematically showing a welded portion of the housing in a processing step.
Figure 10:
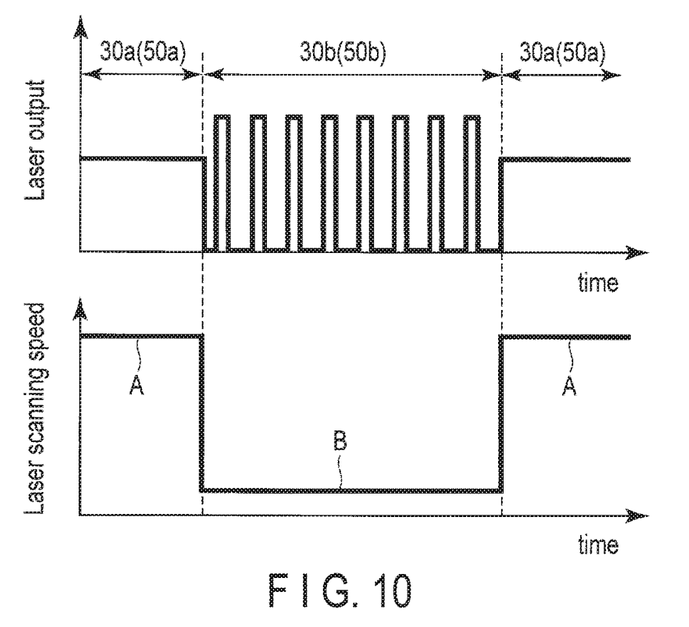
FIG. 10 is diagram showing a first laser irradiation condition and a second laser irradiation condition in a welding step.

FIG. 9 is a perspective view schematically showing a part of the welded portion 50 of the outer cover 16. FIG. 10 is a diagram showing an example of each of the first and second laser irradiation conditions in laser welding.

As shown in FIGS. 9 and 10, under the first laser irradiation condition, the outer cover 16 is laser-welded continuously at a constant laser output (continuous irradiation) and a constant laser scanning speed A. Under the second laser irradiation condition, two items, namely, the laser output waveform and the laser scanning speed are changed. More specifically, under the second laser irradiation condition, the laser beam is irradiated in pulses by repeatedly switching the laser output on and off while fixing a laser scanning speed B constant and greatly slower than the laser scanning speed A in the first laser irradiation condition. Thus, the first welded portion 50a of the outer cover 16 is formed to contain belt-shaped weld beads which continuously extend in the scanning direction of the laser beam by the continuous irradiation of the laser beam. The second welded portions 50b are formed by stacking a plurality of circular weld beads welded by the pulse irradiation of the laser beam in order.

Then, as shown in FIG. 7, it judges whether or not the all-around welding of the entire circumferential portion of the outer cover 16 is completed (ST9), and if not, ST5 to ST8 described above are repeatedly carried out. In this manner, the outer circumferential edge of the outer cover 16 is continuously laser-welded to the first region 30a of the rib 12c and the three second regions 30b, and when the all-round outer circumferential edge of the outer cover 16 has been welded, the welding process is finished. Thus, the circumferential portion of the outer cover 16 can be laser welded in its entire circumferences without a gap.

Note that this embodiment employs the method of scanning the outer cover 16 by a laser beam while moving the housing 10 with the XY table 60, but it is not limited to this. For example, the laser beam irradiation device 62 may be moved for scanning while fixing the housing 10 still. Moreover, in the welding step, the first welded portion 50a and the second welded portion 50b are continuously laser-welded, but it is alternatively possible that first, only the entire first welded portion 50a is laser-welded and then the three second welded portions 50b are laser-welded in order.

As shown in FIG. 7, in the manufacturing process of the HDD, after the laser welding of one round of the circumferential portion is completed, the air in the housing 10 is exhausted through the vents 46 and 48 (ST10), and further, through the vents 46 and 48, a low density gas (inert gas) having a density lower than that of air, for example, helium, is introduced in the housing 10 (ST11) to be enclosed or sealed therein. Then, the seal 52 is stuck on the surface of the outer cover 16 to close the vent 48 (ST12). By the above-discussed processing steps, an enclosed type HDD containing a low-density gas inside is obtained.

According to the magnetic disk device having the above-described structure and its manufacturing method, the laser irradiation condition is changed according to the rib width, or more specifically, the first laser irradiation condition is used for the case where the outer cover is laser-welded to the first region having a great rib width, and it is changed to the second laser irradiation condition for laser-welding the outer cover to the second region having a less rib width. Thus, an appropriate laser welding is carried out for each of the rib widths, and therefore a stable welding quality can be obtained all around the circumference of the welded portion of the outer cover. According to this embodiment, in the second laser irradiation condition, the laser output is not fixed constant, but made in pulses and also the laser scanning speed is significantly reduced. In this manner, the welding is carried out while repeating a melting and a solidifying in each and every spot of the laser irradiation, and therefore a high welding quality can be secured even in the second regions 30b which have a less rib width. A total zone of the second regions 30b having a less rib width is much shorter than the first region 30a, and therefore even if the laser scanning speed is reduced 1/10, the effect on the total welding time is small.

Moreover, the first region 30a and the second region 30b of the rib 12c are subjected to laser welding under different laser irradiation conditions, and therefore it is not necessary to match the rib width of the first region 30a with that of, i.e. a less width of the second region 30b, thereby making it possible to form the first region 30a to have a greater rib width than conventional cases. In this manner, the width of the portion to be welded to the first region 30a can be increased, thereby making it possible to improve the welding quality and airtightness. Or even if the rib width of the first region 30a is the same as the conventional ones, and the second region 30b has a narrow rib, a stable welding quality can be obtained.

As described above, according to this embodiment, it is possible to obtain a disk drive having a high welding quality and an improved airtightness, and its manufacturing method.

Now, an HDD and its manufacturing method according to another embodiment will be explained. In the following explanation of the other embodiment, those elements that are the same as those in the first embodiment will be given the same reference numbers and their detailed explanation will be omitted or simplified. Those elements that are different from the first embodiment will be mainly explained in detail.

Second Embodiment

Figure 11:
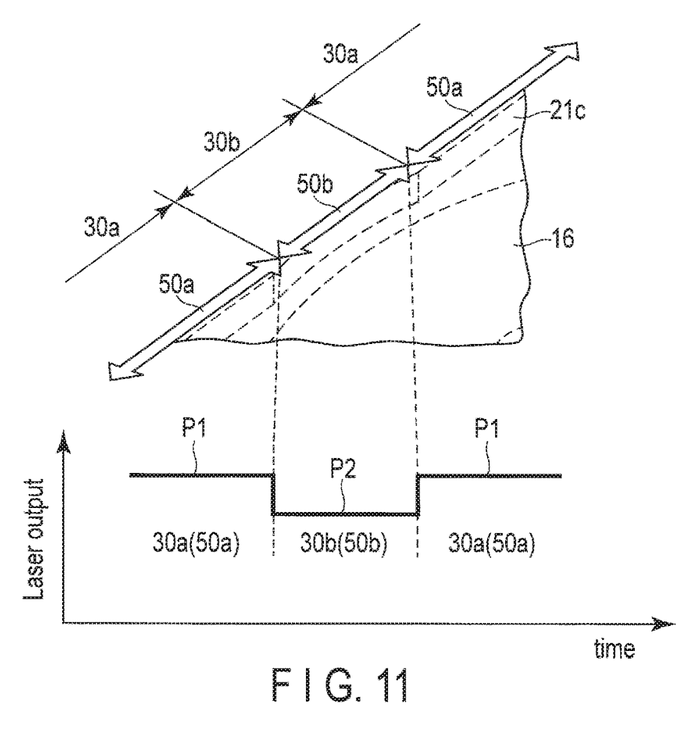
FIG. 11 is a diagram showing a welded portion of a housing of an HDD according to the second embodiment, and a first laser irradiation condition and a second laser irradiation condition in a welding step.
Figure 12:
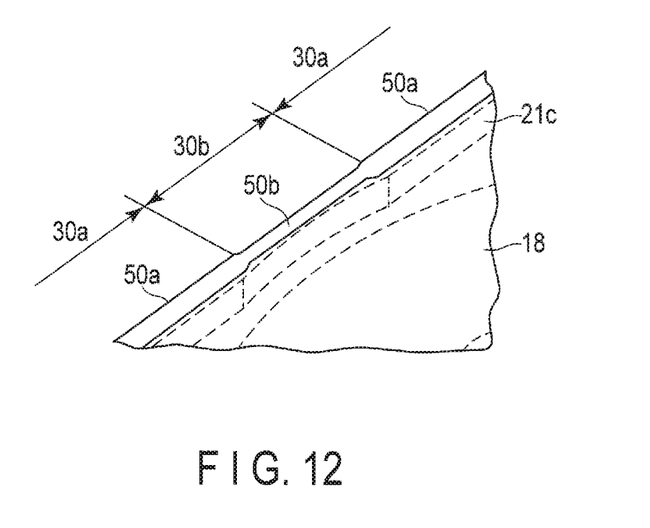
FIG. 12 is a perspective view schematically showing a part of the welded portion 50 of the outer cover 16 in the second embodiment.

FIG. 11 is a diagram showing a part of the HDD according to the second embodiment, an example of each of the first and second laser irradiation conditions in laser welding, and FIG. 12 is a perspective view schematically showing a part of the welded portion of the outer cover 16.

In this embodiment, under the first laser irradiation condition for welding an outer cover 16 to a first region 30a of a rib 12c, a laser output is set at a fixed first level P1 (continuous irradiation), whereas under the second laser irradiation condition for welding to a second region 30b of the rib 12c, the laser output is set at a second fixed level P2 (continuous irradiation) lower than the first level P1, as shown in FIG. 11.

Thus, as shown in FIG. 12, the first welded portion 50a of the outer cover 16 is formed to contain belt-shaped weld beads which continuously extend in the scanning direction of the laser beam by the continuous irradiation of the laser beam. The second welded portions 50b are formed to contain belt-shaped weld beads which continuously extend in the scanning direction of the laser beam by the continuous irradiation of the laser beam, respectively. The weld beads of the second welded portions 50b have a second width less than a first width of the welded beads of the first welded portion 50a.

When welding to the narrower second region 30b, the laser output is thus reduced to decrease the amount of melting of the rib of the base. Thus, the second region 30b of narrow rib can be well handled. Since the laser output is temporarily changed while welding the outer cover 16 in its entire circumference all around, unstable factors may increase, but as compared to the entire circumference, the corresponding portions (the second regions 30b) are very small or short. The merit which can enlarge almost the entire rib dominates over these unstable factors.

The combinations of the first and second laser irradiation conditions are not limited to those discussed in the first and second embodiments described above, but various combinations which will now be provided are also possible.

1) The first laser irradiation condition defines irradiation of a laser beam in pulses and the pulse frequency is set to F1 (for example, 10 Hz). The second laser irradiation condition defines irradiation of a laser beam in pulses and the pulse frequency is set to F2 (for example, 50 Hz) higher than F1.

2) The first laser irradiation condition defines irradiation of a laser beam in pulses and the pulse pitch is set to C1 (for example, 0.3 mm). The second laser irradiation condition defines irradiation of a laser beam in pulses and the pulse pitch is set to C2 (for example, 0.1 mm) less than C1.

3) The first laser irradiation condition defines irradiation of a laser beam in pulses and the diameter of a beam spot is set to D1 (for example, φ0.4 mm). The second laser irradiation condition defines irradiation of a laser beam in pulses and the diameter of a beam spot is set to D2 (for example, φ0.2 mm) less than D1.

4) The first laser irradiation condition defines irradiation of a laser beam in pulses and the focal depth of a beam spot is set to Z1 (for example, 5 mm). The second laser irradiation condition defines irradiation of a laser beam in pulses and the focal depth of a beam spot is set to Z2 (for example, 0 mm) less than Z1.

5) The first laser irradiation condition defines continuous irradiation of a laser beam and the scanning speed of the laser beam is set to S1 (for example, 50 cm/s). The second laser irradiation condition defines continuous irradiation of a laser beam and the scanning speed of the laser beam is set to S2 (for example, 25 cm/s) slower than S1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Additionally, for example, the locations of the narrow rib portions in the housing is not limited to those discussed in the above-provided embodiments, but the narrow ribs may be located at any other arbitrary positions. The number of narrow rib portions is not limited to three, i.e., it may be set to one, two or four or more. The materials, shapes, sizes, etc., of the elements forming the disk drive may be variously changed as needed. In the disk drive, the number of magnetic disks and that of magnetic heads may be increased or decreased as needed, and the size of each of the magnetic disks may be selected from various alternatives.

What is claimed is:

1. A method of manufacturing a disk device, the method comprising:
    placing a recording medium in a base of a housing;
    fixing an inner cover onto the base to close an opening of the base;
    placing an outer cover on the base to overlay the inner cover; and
    welding a peripheral portion of the outer cover to the base from a point around to the point while controlling a welding condition depending on a section of the peripheral portion, the welding comprising welding a part of the peripheral portion of the outer cover to the base under a first welding condition, and
    welding another part of the peripheral portion of the outer cover to the base under a second welding condition different from the first welding condition.

2. The method of claim 1, further comprising:
    exhausting the housing through a vent of the outer cover, and
    filling the housing with a gas having a density lower than that of air after the welding.

3. A method of manufacturing a disk device, the method comprising:
    placing a recording medium in a base of a housing;
    fixing an inner cover onto the base to close an opening of the base;
    placing an outer cover on the base to overlay the inner cover; and welding a peripheral portion of the outer cover to the base from a point around to the point while controlling a welding condition depending on a section of the peripheral portion, the welding including a laser welding which comprises welding a part of the peripheral portion of the cover to the base by a laser beam under a first laser irradiation condition, and
    welding another part of the peripheral portion of the cover to the base by a laser beam under a second laser irradiation condition different from the first laser irradiation condition.

4. The method of claim 3, wherein
    under the first laser irradiation condition, the laser beam is irradiated at a first laser output, and
    under the second laser irradiation condition, the laser beam is irradiated at a second laser output different from the first laser output.

5. The method of claim 3, wherein
    under the first laser irradiation condition, the laser beam is irradiated continuously, and
    under the second laser irradiation condition, the laser beam is irradiated in pulses.

6. The method of claim 3, wherein
    under the first laser irradiation condition, the laser beam is irradiated at a first scanning speed, and
    under the second laser irradiation condition, the laser beam is irradiated at a second scanning speed different from the first scanning speed.

7. The method of claim 3, wherein
    under the first laser irradiation condition, the laser beam is irradiated in pulses at a first pulse frequency, and
    under the second laser irradiation condition, the laser beam is irradiated in pulses at a second pulse frequency different from the first pulse frequency.

8. The method of claim 3, wherein
    under the first laser irradiation condition, the laser beam is irradiated in pulses at a first pulse pitch, and
    under the second laser irradiation condition, the laser beam is irradiated in pulses at a second pulse pitch different from the first pulse pitch.

9. The method of claim 3, wherein
    under the first laser irradiation condition, the laser beam is irradiated in pulses by a first beam spot diameter, and
    under the second laser irradiation condition, the laser beam is irradiated in pulses at a second beam spot diameter less than the first pulse spot diameter.

10. The method of claim 3, wherein
    under the first laser irradiation condition, the laser beam is irradiated in pulses by a beam spot of a first focal depth, and under the second laser irradiation condition, the laser beam is irradiated in pulses by a beam spot having a second focal depth less than the first focal depth.

11. The method of claim 3, wherein under the first laser irradiation condition, the laser beam is irradiated continuously at a first scanning speed, and under the second laser irradiation condition, the laser beam is irradiated continuously at a second scanning speed lower than the first scanning speed.

12. The method of claim 3, wherein under the first laser irradiation condition, a laser irradiated position is set at a center of the first region in a width direction, and under the second laser irradiation condition, a laser irradiated position is set at a center of the second region in a width direction.

13. A method of manufacturing a disk device, the method comprising:

placing a recording medium in a base of a housing;

fixing an inner cover onto the base to close an opening of the base;

placing an outer cover on the base to overlay the inner cover; and welding a peripheral portion of the outer cover to the base sequentially from a point around to the point while controlling a welding condition, the welding comprising welding a part of the peripheral portion of the outer cover to the base under a first welding condition, and welding another part of the peripheral portion of the outer cover to the base under a second welding condition different from the first welding condition.

* * * * *